US012634542B2

(12) United States Patent
Chen

(10) Patent No.:  US 12,634,542 B2
(45) Date of Patent:      May 19, 2026

(54) INFORMATION DISPLAY CONTROL METHOD AND APPARATUS, ELECTRONIC DEVICE AND STORAGE MEDIUM

(71) Applicant: NETEASE (HANGZHOU) NETWORK CO., LTD., Hangzhou (CN)

(72) Inventor: Zeyu Chen, Hangzhou (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 105 days.

(21) Appl. No.: 17/760,006

(22) PCT Filed: Jun. 19, 2020

(86) PCT No.: PCT/CN2020/097186
§ 371 (c)(1),
(2) Date: Aug. 3, 2022

(87) PCT Pub. No.: WO2021/169092
PCT Pub. Date: Sep. 2, 2021

(65) Prior Publication Data
US 2023/0062695 A1     Mar. 2, 2023

(30) Foreign Application Priority Data

Feb. 28, 2020    (CN) .......................... 202010126972.0

(51) Int. Cl.
*H04N 21/266*      (2011.01)
*H04N 21/2187*    (2011.01)
*H04N 21/258*      (2011.01)

(52) U.S. Cl.
CPC ....... *H04N 21/266* (2013.01); *H04N 21/2187* (2013.01); *H04N 21/25875* (2013.01)

(58) Field of Classification Search
CPC ............ H04N 21/266; H04N 21/2187; H04N 21/25875
See application file for complete search history.

(56) References Cited

U.S. PATENT DOCUMENTS

2010/0100904 A1     4/2010  Kawakami et al.
2011/0154223 A1*   6/2011  Whitnah ................. H04L 51/52
                                                                    715/753
(Continued)

FOREIGN PATENT DOCUMENTS

CN          102905170 A       1/2013
CN          104380335 A       2/2015
(Continued)

OTHER PUBLICATIONS

International Search Report dated Sep. 9, 2020 for PCT International Application No. PCT/CN2020/097186.
(Continued)

*Primary Examiner* — Nicholas T Corbo
(74) *Attorney, Agent, or Firm* — Patterson + Sheridan, LLP; Gero G. McClellan

(57) ABSTRACT

The present disclosure provides an information display control method and apparatus, an electronic device, and a storage medium, relating to the field of live streaming technology. The information display control method comprises: acquiring subject data corresponding to real-time video data being played on a target interface; according to the subject data, acquiring, from a content interactive platform, content data corresponding to the subject data; and simultaneously displaying, on the target interface, the real-time video data and the content data.

11 Claims, 4 Drawing Sheets

(56) References Cited

U.S. PATENT DOCUMENTS

| | | | | |
|---|---|---|---|---|
| 2012/0124625 | A1* | 5/2012 | Foote | H04N 21/4828 |
| | | | | 725/53 |
| 2012/0331496 | A1 | 12/2012 | Copertino | |
| 2013/0205336 | A1* | 8/2013 | Ballai | H04N 21/442 |
| | | | | 725/32 |
| 2016/0371274 | A1* | 12/2016 | Ng | G06F 16/24573 |
| 2018/0160180 | A1* | 6/2018 | Kedenburg, III | H04N 21/4753 |
| 2020/0159802 | A1* | 5/2020 | Hooper | G06V 20/00 |

FOREIGN PATENT DOCUMENTS

| | | | | |
|---|---|---|---|---|
| CN | 104575553 | A | 4/2015 | |
| CN | 104618806 | A | 5/2015 | |
| CN | 105589941 | A | 5/2016 | |
| CN | 107911708 | A | 4/2018 | |
| CN | 109189293 | A | 1/2019 | |
| JP | 2008219424 | A | 9/2008 | |
| WO | WO-0033560 | A2 * | 6/2000 | G06F 3/0482 |

OTHER PUBLICATIONS

The First Office Action dated Sep. 7, 2020 for Chinese Patent No. 202010126972.0.

The Notice of Allowance dated Apr. 8, 2021 for Chinese Patent No. 202010126972.0.

* cited by examiner

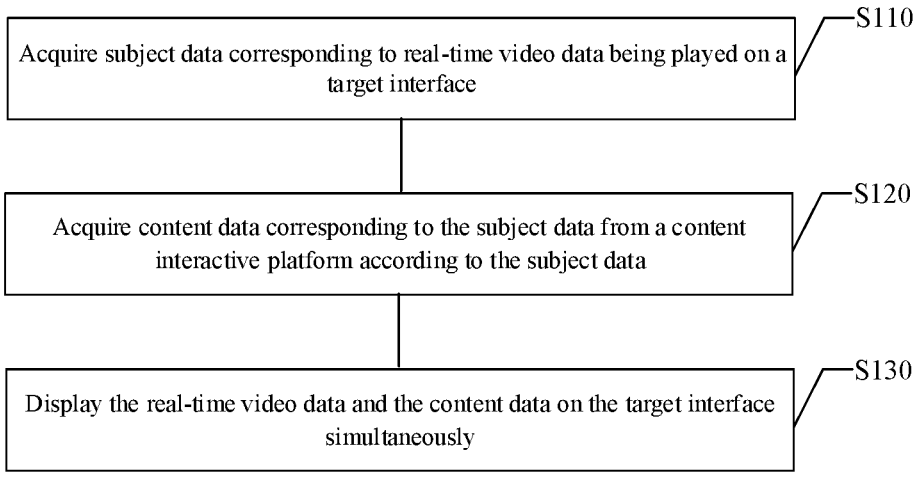

Acquire subject data corresponding to real-time video data being played on a target interface ⌐S110

Acquire content data corresponding to the subject data from a content interactive platform according to the subject data ⌐S120

Display the real-time video data and the content data on the target interface simultaneously ⌐S130

FIG. 1

Detect an identification code in the content interactive platform, and extract the content data corresponding to the identification code ⌐S210

Calculate a similarity between the subject data and the content data ⌐S220

Acquire content data whose similarity with the subject data is greater than or equal to a similarity threshold ⌐S230

INFORMATION DISPLAY CONTROL METHOD AND APPARATUS, ELECTRONIC DEVICE AND STORAGE MEDIUM

CROSS-REFERENCE

The present application claims the priority to the Chinese Patent Application NO. 202010126972.0, entitled "INFORMATION DISPLAY CONTROL METHOD AND APPARATUS, ELECTRONIC DEVICE AND STORAGE MEDIUM", filed on Feb. 28, 2020, the entire contents of which are hereby incorporated by reference.

TECHNICAL FIELD

The present disclosure relates to the field of live broadcast technologies, and in particular to an information display control method, an information display control apparatus, an electronic device, and a computer-readable storage medium.

BACKGROUND

With the rapid development of Internet technologies, watching live game broadcast and commenting or discussing the game on a content interactive platform at the same time has increasingly become an indispensable part of people's entertainment.

At present, if a user needs to browse other people's comments or discussions on the game on the content interactive platform while watching the live broadcast, the user needs to close an application of the live game broadcast during the game or at the end of the game, and then download or open an application corresponding to the content interactive platform for browsing.

It should be noted that the information disclosed in the Background section above is only for enhancing the understanding of the background of the present disclosure, and thus may include information that does not constitute prior art known to those of ordinary skill in the art.

SUMMARY

Embodiments of the present disclosure provide an information display control method, an information display control apparatus, an electronic device, and a computer-readable storage medium.

According to a first aspect of the embodiments of the present disclosure, there is provided an information display control method, including: acquiring subject data corresponding to real-time video data being played on a target interface; acquiring content data corresponding to the subject data from a content interactive platform according to the subject data; and displaying the real-time video data and the content data on the target interface simultaneously.

According to a second aspect of the embodiments of the present disclosure, there is provided an information display control apparatus, including: a subject data acquisition module, configured to acquire subject data corresponding to real-time video data being played on a target interface; a content data acquisition module, configured to acquire content data corresponding to the subject data from a content interactive platform according to the subject data; and a content data display module, configured to display the real-time video data and the content data on the target interface simultaneously.

According to a third aspect of the embodiments of the present disclosure, there is provided an electronic device, including: a processor; and a memory having computer-readable instructions stored thereon, which, when executed by the processor, implement the information display control method described in the foregoing first aspect.

According to a fourth aspect of the embodiments of the present disclosure, there is provided a computer-readable storage medium having a computer program stored thereon, that, when executed by a processor, implements the information display control method described in the foregoing first aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be acquired by those skilled in the art without departing from the drawings described herein.

FIG. 1 is a schematic diagram illustrating a flow of an information display control method according to some embodiments of the present disclosure;

FIG. 2 is a schematic diagram illustrating a flow of acquiring content data according to some embodiments of the present disclosure;

In the drawings, same or corresponding reference numerals indicate same or corresponding parts.

DETAILED DESCRIPTION

Figure 3:
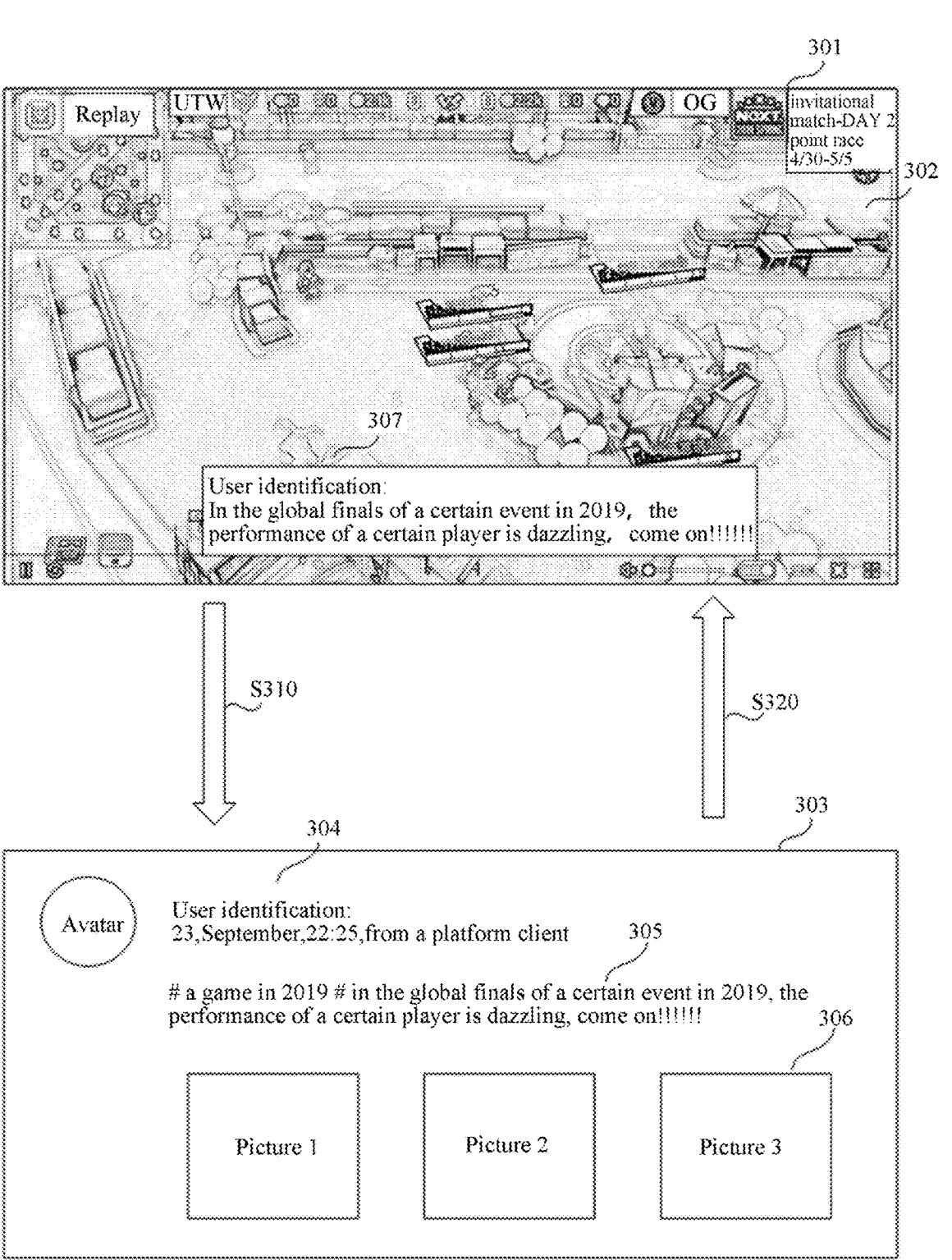
FIG. 3 is a schematic diagram schematically illustrating an example application scenario corresponding to an information display control method according to some embodiments of the present disclosure.

Example embodiments will now be described more fully with reference to the accompanying drawings. However, the embodiments may be implemented in a variety of forms and should not be construed as being limited to the examples set forth herein; rather, these embodiments are provided so that the present disclosure will be more complete so as to convey the idea of the exemplary embodiments to those skilled in this art.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, devices, materials, steps and the like may be employed. In other instances, well-known methods, devices, implementations or operations are not shown or described in detail to avoid obscuring various aspects of the present disclosure.

In addition, the drawings are merely schematic representations of the present disclosure and are not necessarily drawn to scale. Some of the block diagrams shown in the figures are functional entities and do not necessarily correspond to physically or logically separate entities. That is, these functional entities may be implemented in software, or implemented in one or more hardware modules or integrated circuits, or implemented in different networks and/or processor devices and/or microcontroller devices.

In the exemplary embodiments, an information display control method is provided first. The information display control method may be applied to a terminal device or a server, which is not particularly limited in this exemplary embodiment. Hereinafter, a situation where the method is performed by the terminal device is described as an example. FIG. 1 is a schematic diagram illustrating a flow of an information display control method according to some embodiments of the present disclosure. As shown in FIG. 1, the information display control method may include the following steps:

in step S110, subject data corresponding to real-time video data being played on a target interface is acquired;

in step S120, content data corresponding to the subject data is acquired from a content interactive platform according to the subject data; and in step S130, the real-time video data and the content data are displayed on the target interface simultaneously.

According to the information display control method in the embodiments, on the one hand, by acquiring, according to the subject data corresponding to the real-time video data currently being played, the corresponding content data from the content interactive platform, the accuracy and consistency of the content data and the real-time video data is ensured, and the content data may be acquired and displayed timely to ensure the timeliness of the content data. On the other hand, no extra operation is required from the user because the corresponding content data is directly acquired from the content interactive platform according to the subject data corresponding to the real-time video data, and displaying the content data and the real-time video data on the target interface simultaneously. That is, user operations are reduced while ensuring the timeliness of content data, thereby improving the fluency of watching real-time video data and enhancing user experience.

Hereinafter, the information display control method in the exemplary embodiment will be further described.

In step S110, the subject data corresponding to the real-time video data being played on the target interface is acquired.

In some embodiments of the present disclosure, the target interface may refer to a display interface for playing video data. For example, the target interface may be a graphical user interface corresponding to the terminal device used to play the video data, or a sub-display interface (sub-window) in the graphical user interface corresponding to the terminal device, which is not particularly limited in the exemplary embodiment. The real-time video data may refer to video data showing an ongoing target event in the target interface in real time through network. For example, the real-time video data may refer to an event live video of a certain electronic game or a live video of a certain streamer. Of course, it may also be other real-time live video performed over the network, which is not limited in the embodiments. The subject data may refer to data that characterizes core content corresponding to the real-time video data. For example, the subject data may be title data corresponding to the real-time video data, or introduction data corresponding to the real-time video data. Of course, the subject data may also be data that is extracted from the real-time video data in a preset manner, and is capable of characterizing the core content corresponding to the real-time video data, which is not particularly limited in the embodiments.

Specifically, core word data in the real-time video data or the introduction data associated with the real-time video data may be extracted in a manner, such as text recognition or keyword matching; the subject data corresponding to the real-time video data being played on the target interface is determined according to the core word data.

The text recognition refers to an ability to convert text in video screens/pictures into characters. For example, the text recognition may use optical character recognition (OCR) algorithm, or it may be a pre-trained deep learning model that may recognize characters in pictures, which is not specifically limited by the embodiments. The keyword matching may be used to retrieve specified core word data from the text. The introduction data may refer to data that is associated with the real-time video data and introduces core content of the real-time video data. The core word data may refer to high-frequency words (that is, words with higher occurrence frequency) extracted from the real-time video data or the introduction data associated with the real-time video data, and the appeared high-frequency words are used as the core word data that may reflect the core content of the real-time video data. For example, frame extraction is performed on the real-time video data, and the text recognition is performed on the extracted video frames to determine the high-frequency words contained therein, or the high-frequency words are screened out from the introduction data associated with the real-time video data, and finally, the determined high-frequency words are used as the core word data corresponding to the real-time video data, and then the subject data corresponding to the real-time video data is obtained by splicing or semantically connecting the core word data. It is easy to understand that the related technical means used here are merely illustrative examples, and technical means that may achieve the same effect should also be within the protection scope of the present disclosure, which is not specifically limited by the embodiments.

In step S120, content data corresponding to the subject data is acquired from the content interactive platform according to the subject data.

In some embodiments of the present disclosure, the content interactive platform may be a platform provided to users, where the user publishes content, or multiple users conduct subject discussion (or comment) interaction. For example, the content interactive platform may include, but not limited to, Weibo, WeChat and other content interactive platforms, which is not specifically limited by the embodiments. A pre-authorized content interactive platform may refer to a content interactive platform for which permission has been applied and allowed in advance. By applying for authorization in advance, there is no need to acquire the permissions while acquiring the data in the content interactive platform, which improves the fluency of data acquisition and avoids jumping to a permission acquiring page when the user is watching the real-time video data.

The content data may refer to data associated with the subject data in the pre-authorized content interactive platform. For example, if the subject data may be "a game in 2019", the content data may be comments or content related to the subject data. For example, the content data may be "The certain game in 2019 is really wonderful!", or "A certain player performed brilliantly in the game in 2019!" Of course, this is only an example for description, and should not expose any special restriction to the embodiments. Specifically, the content data associated with the subject data may be acquired from the pre-authorized content interactive platform through a preset interface.

FIG. 2 is a schematic diagram illustrating a flow of acquiring content data according to some embodiments of the present disclosure.

Referring to FIG. 2, in step S210, an identification code in the content interactive platform is detected, and the content data corresponding to the identification code is extracted.

In an exemplary embodiment of the present disclosure, the identification code may refer to a symbol identifier corresponding to the content data in the content interactive platform. For example, the content interactive platform may be a Weibo platform, and the identification code of the content interactive platform may be "#" in a subject identifier "#hot subject #" in content published by the user. Of course, it may also be an identifier corresponding to content data in other content interactive platforms. For example, the content interactive platform may be the WeChat Moments platform, and the identification code of the content interactive platform may also be a user identifier (account nickname) corresponding to the content posted by the user. Of course, this is only an example, and should not cause any special limitation to the embodiments. The identification code in the content interactive platform is detected, and it is determined whether the text data (such as, "#hot subject #") corresponding to the identification code is associated with the subject data (similar). When the text data corresponding to the identification code is associated with the subject data, the content data published by the user corresponding to the identification code is extracted.

In step S220, a similarity between the subject data and the content data is calculated.

In an exemplary embodiment of the present disclosure, after the content data published by the user corresponding to the identification code is extracted, it is continued to calculate the similarity between the subject data and the content data, so as to ensure the degree of matching between the content data and the subject data, and to ensure the accuracy of the content data. The similarity may refer to similarity data of vectors corresponding to the subject data and the content data, for example, a cosine similarity of vectors corresponding to the subject data and the content data, or a Euclidean distance of the vectors corresponding to the subject data and the content data. Of course, the similarity may also be other similarity data of vectors corresponding to the subject data and the content data, which is not particularly limited in the embodiments.

In step S230, content data whose similarity with the subject data is greater than or equal to a similarity threshold is acquired.

In an exemplary embodiment of the present disclosure, the similarity threshold may refer to preset data used for determining a degree of association between the subject data and the content data. For example, the similarity threshold may be 0.5 or 0.8, and the specific value may be customized according to the actual situation by the developers. Of course, a setting component may also be provided to enable users to customize settings, which is not particularly limited in the embodiments. In response to determining that the similarity of the vectors corresponding to the subject data and the content data is greater than or equal to the similarity threshold, the text in the content data is considered to be associated with the real-time video data (that is, the content comments or the discussion in the content data is regarding the event in the real-time video data).

Specifically, a preset user identification list corresponding to each content interactive platform is acquired; the identification code associated with each user identification in the preset user identification list is detected, and the content data corresponding to the identification code is extracted. The preset user identification list may refer to a user-defined list of accounts followed by users corresponding to each content interactive platform (that is, the preset user identification list may store account identifications for which the user expects to see comments). The user identification may refer to identification information used for the published content in the content interactive platform. For example, the user identification may be an account nickname in the content interactive platform, or it may be a unique account code in the content interactive platform, which is not particularly limited in the embodiments. Detection of the identification code associated with the subject data published by each user identification in the preset user identification list is prioritized, and the content data corresponding to the identification code is extracted.

In some embodiments, an identification code associated with a target user identification is detected; and a popularity value of content data corresponding to the identification code is calculated according to a preset popularity algorithm, and content data whose popularity value exceeds a popularity threshold is extracted. The target user identification may refer to a user identification that is not in the preset user identification list, and by which the published content data is associated with the subject data. The popularity algorithm may refer to a algorithm for calculating the popularity (popularity extent) of the content data published in the content interactive platform. For example, the popularity algorithm may be a static scoring algorithm (that is, a scoring result obtained in view of a user interaction condition without considering a time factor), or may also be a time period weighting algorithm (that is, configuring different time periods with different weights to calculate the popularity of the content data). Of course, the popularity algorithm may also be other algorithms for calculating the popularity of the content data, which is not specifically limited in the embodiments. The popularity threshold may refer to pre-set data used for determining whether the popularity of the content data meets the requirements. When it is determined that the popularity value of the content data is greater than or equal to the popularity threshold, the content data is extracted.

Specifically, core extraction is performed on the content data to determine core content data corresponding to the content data; and the core content data is sent to the target interface, so that the real-time video data and the core content data are displayed on the target interface simultaneously. The core extraction may refer to a processing process for extracting the core content from the content data. The core extraction may also be considered as a processing process for filtering useless data in the content data. The core content data may refer to data obtained by performing the core extraction on the content data. For example, the core extraction processing is performed on the content data "#a game in 2019 #a player performed brilliantly in the game in 2019!" to acquire the core content data "a player performed brilliantly in the game in 2019!". Of course, it is only a schematic illustration, and should not cause any special limitation to the embodiments.

Continuing to refer to FIG. 1, in step S130, the real-time video data and the content data are simultaneously displayed on the target interface.

In an exemplary embodiment of the present disclosure, the content data (the core content data) extracted from the content interactive platform is sent to the target interface, so that the content data is displayed on an upper layer of the real-time video data being played on the target interface.

Specifically, the content data may be displayed within a preset time interval, and is no longer displayed outside the preset time interval. The preset time interval may refer to the time for displaying the content data on the target interface. For example, the preset time interval may be 5 seconds (that is, the content data is only displayed for 5 seconds on the upper layer of the real-time video data), or 10 seconds. The user may customize the specific time interval, which is not specifically limited in the embodiments. By setting the preset time interval, the content data may be automatically hidden after being browsed by the user, which prevents from affecting the user's viewing due to long-term obstruction of the real-time video data, and thus improving the user's experience.

In some embodiments, in response to detecting that quantity of the content data is greater than or equal to a quantity threshold, a plurality of content data is displayed on the target interface in a scrolling manner. The quantity threshold may refer to a value used for determining whether to display the plurality of content data in the scrolling manner. For example, the quantity threshold may be 3 or 5. The specific quantity threshold may be determined by the developer according to the actual situation. Of course, a component may also be provided to allow the user to customize the quantity threshold, which is not particularly limited in the embodiments.

Scrolling display may refer to a process of automatically displaying second content data after first content data is displayed on the target interface for a preset time interval. The preset time interval may be a time interval corresponding to the display of single content data, or may also be a time interval corresponding to the display of multiple content data, and the user may set the time intervals separately. For example, both the preset time interval for displaying the single content data and displaying the multiple content data in the scrolling manner may be set as 5 seconds. Of course, the preset time interval for displaying the single content data may be set as 8 seconds, and the preset time interval for scrolling display of multiple content data may be set as 5 seconds, which is not particularly limited in the exemplary embodiments.

It should be noted that the "first" and "second" in the "first content data" and "second content data" in the embodiments are only for distinguishing different content data, and should not cause any special restrictions on the embodiments.

In some embodiments, a jump control is provided in a display area where the content data is displayed, so as to enable the content interactive platform corresponding to the currently displayed content data through the jump control. The jump control may refer to a preset control used for enabling the content interactive platform associated with the currently displayed content data. For example, the jump control may be a touch control separately set, or a box that displays the content data. Of course, the jump control may also be in other forms, which is not specifically limited in the embodiments. By setting the jump control, the user may quickly enable the corresponding content interactive platform when participating in the discussion of the currently displayed content data (preferably, after enabling the content interactive platform, a position corresponding to the content data may be directly located), the user's operation is simplified and the user experience is improved.

In an exemplary embodiment of the present disclosure, a non-focus area corresponding to the real-time video data is determined; and the content data is displayed in the non-focus area. The non-focus area may refer to an area where a dynamic image in the real-time video data is less likely to appear. For example, the non-focus area may be a score display area in an event live system for Moba (Multiplayer Online Battle Arena) type 5V5 mobile games. By determining the non-focus area corresponding to the real-time video data and displaying the content data in the non-focus area, occlusion of the real-time video data when the content data is displayed may be reduced, and the user's experience of watching the real-time video data may be improved. Specifically, the non-focus area corresponding to the real-time video data may be determined through a preset image detection algorithm or a non-focus area determination model.

FIG. 3 a schematic diagram schematically illustrating an example application scenario corresponding to an information display control method according to some embodiments of the present disclosure.

As shown in FIG. 3, in step S310, the subject data corresponding to real-time video data 302 currently played on a target interface 301 is acquired, and corresponding content data 303 is determined on the pre-authorized content interactive platform according to the subject data, and the content data 303 may include a user identification (a user account nickname or a uniform code) 304, published content 305 (may include a reference subject, that is, the identification code, "#a game in 2019 #", and the user's comment content "In the global finals of a certain event in 2019, the performance of a certain player is dazzling, come on!!!" and related pictures 306.

In step S320, the core content data is determined by performing core extraction on the content data 303. The core content data may be considered as data acquired by removing avatar information, the identification code "#a game in 2019 #" in the published content 305, and the related pictures 306 from the content data 303. That is to say, the core content data may include the user identification 304 and the user's comment content "In the global finals of a certain event in 2019, the performance of a certain player is dazzling, come on!!!". In addition, the core content data is sent to the target interface 301 so that the real-time video data 302 and the core content data 307 are displayed at the same time (In some embodiments, a box corresponding to the core content data 307 may be set as a jump control, so that the content interactive platform corresponding to the core content data 307 may be enabled by clicking the box). Of course, this is only an example, and should not cause any special limitation to the embodiments.

The technical solutions provided by the embodiments of the present disclosure may include the following beneficial effects.

In the information display control method in the exemplary embodiments of the present disclosure, the subject data corresponding to the real-time video data being played on the target interface is acquired, and then the content data corresponding to the subject data is acquired from a pre-authorized content interactive platform according to the subject data, and the content data is sent to the target interface so that the real-time video data and the content data are displayed on the target interface simultaneously. On the one hand, through acquiring, according to the subject data corresponding to the real-time video data currently being played, the corresponding content data from the content interactive platform, the accuracy and consistency of the content data and the real-time video data can be ensured, and the content data may be acquired and displayed timely to ensure the timeliness of the content data. On the other hand, no extra operation by the user is needed because the corresponding content data is acquired from the content interactive platform directly according to the subject data corresponding to the real-time video data, and the content data and the real-time video data are simultaneously displayed on the target interface. That is, user operations are reduced while ensuring the timeliness of content data, thereby improving the fluency of watching real-time video data and enhancing user experience.

It should be noted that although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Figure 4:
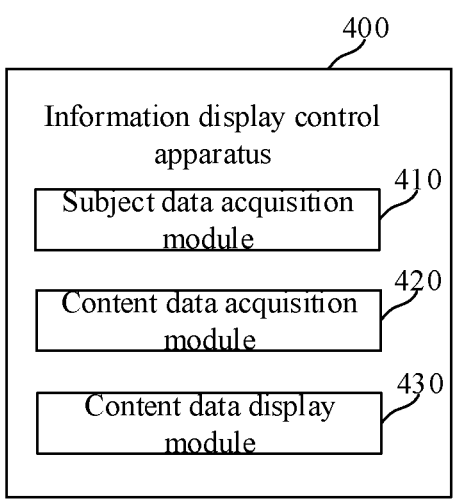
FIG. 4 is a schematic diagram schematically illustrating an information display control apparatus according to some embodiments of the present disclosure.

Further, embodiments of the present disclosure also provide an information display control apparatus. Referring to FIG. 4, an information display control apparatus 400 includes: a subject data acquisition module 410, a content data acquisition module 420, and a content data display module 430. The subject data acquisition module 410 is configured to acquire subject data corresponding to real-time video data being played on a target interface; the content data acquisition module 420 is configured to acquire content data corresponding to the subject data from a content interactive platform according to the subject data; and the content data display module 430 is configured to display the real-time video data and the content data on the target interface simultaneously.

In some embodiments of the present disclosure, based on the foregoing solution, the content data acquisition module 420 further includes: a content extraction unit, configured to detect an identification code in the content interactive platform, and extract the content data corresponding to the identification code; a similarity calculation unit, configured to calculate a similarity between the subject data and the content data; and a content data acquisition unit, configured to acquire content data whose similarity with the subject data is greater than or equal to a similarity threshold.

In an exemplary embodiment of the present disclosure, based on the foregoing solution, the content extraction unit is further configured to: acquire a preset user identification list corresponding to each content interactive platform; and detect the identification code associated with each user identification in the preset user identification list, and extract the content data corresponding to the identification code.

In an exemplary embodiment of the present disclosure, based on the foregoing solution, the content extraction unit is further configured to: detect an identification code associated with a target user identification, and the target user identification is not in a preset user identification list; and calculate a popularity value of content data corresponding to the identification code according to a preset popularity algorithm, and extract content data whose popularity value exceeds a popularity threshold.

In an exemplary embodiment of the present disclosure, based on the foregoing solution, the content data display module 430 is further configured to: determine core content data corresponding to the content data by performing core extraction on the content data; and send the core content data to the target interface, so that the real-time video data and the core content data are displayed on the target interface simultaneously.

In an exemplary embodiment of the present disclosure, based on the foregoing solution, the information display control apparatus 400 further includes a scroll display unit configured to: display a plurality of the content data on the target interface in a scrolling manner, in response to detecting that quantity of the content data is greater than or equal to a quantity threshold.

In an exemplary embodiment of the present disclosure, based on the foregoing solution, the information display control apparatus 400 further includes a jump unit, configured to provide a jump control in a display area where the content data is displayed, so as to enable a content interactive platform corresponding to the currently displayed content data through the jump control.

In an exemplary embodiment of the present disclosure, based on the foregoing solution, the content data display module 430 further includes a non-focus area determination unit, configured to: determine a non-focus area corresponding to the real-time video data; and display the content data in the non-focus area.

In some embodiments of the present disclosure, based on the foregoing solution, the subject data acquisition module 410 is further configured to: extract, through a preset text recognition tool, core word data in the real-time video data or introduction data associated with the real-time video data; and determine the subject data corresponding to the real-time video data being played on the target interface according to the core word data.

Specific details of the modules of the above-mentioned information display control apparatus have been described in detail in the corresponding information display control method, and therefore will not be repeated here.

It should be noted that although several modules or units of the information display control apparatus are mentioned in the above detailed description, such division is not mandatory. In fact, according to the embodiments of the present disclosure, the features and functions of two or more modules or units described above may be embodied in one module or unit. Conversely, the features and functions of a module or unit described above may be further divided into multiple modules or units.

In addition, in an exemplary embodiment of the present disclosure, there is also provided an electronic device capable of implementing the above-mentioned information display control method.

Those skilled in the art can understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to as "circuit", "module', or "system".

An electronic device 500 according to some embodiments of the present disclosure is described below with reference to FIG. 5. The electronic device 500 shown in FIG. 5 is only an example, and should not impose any limitation on the functions and scope of use of the embodiments of the present disclosure.

Figure 5:
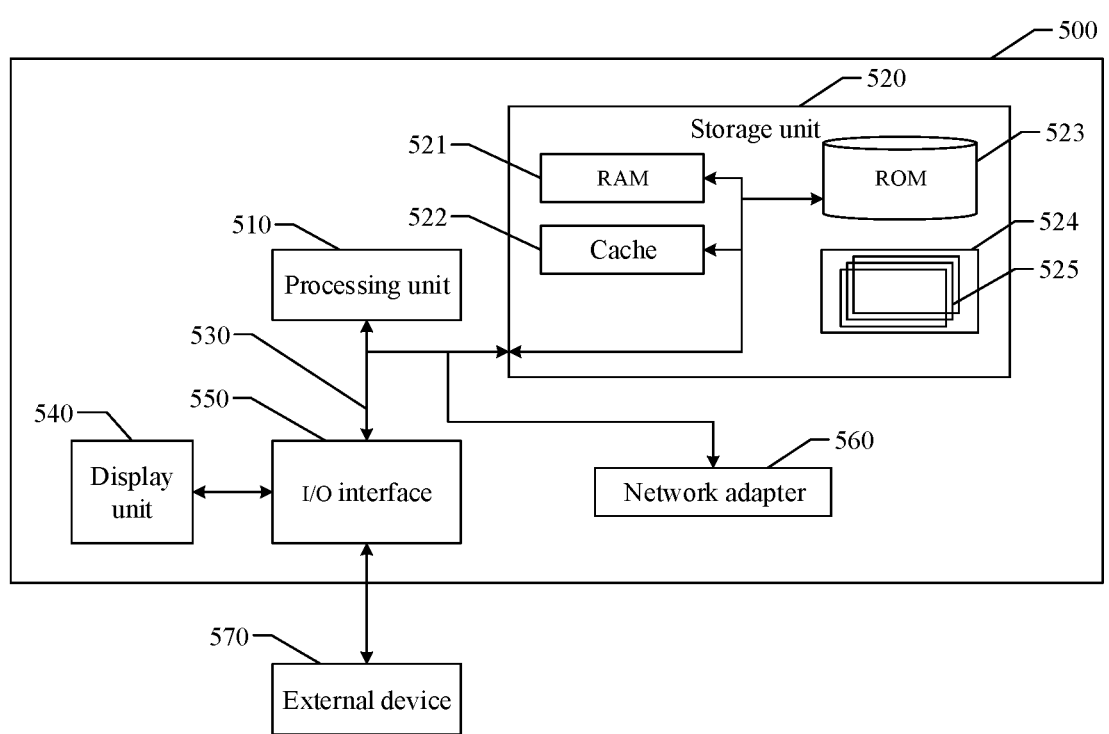
FIG. 5 is a schematic structural diagram schematically illustrating a computer system of an electronic device according to some embodiments of the present disclosure.

As shown in FIG. 5, the electronic device 500 is shown in the form of a general-purpose computing device. The components of the electronic device 500 may include, but are not limited to, at least one processing unit 510, at least one storage unit 520, a bus 530 connecting different system components (including the storage unit 520 and the processing unit 510), and a display unit 540.

The storage unit stores program codes, and the program codes may be executed by the processing unit 510, so that the processing unit 510 executes various exemplary embodiments according to the present disclosure described in the "exemplary methods" section of the present specification. For example, the processing unit 510 may perform the steps shown in FIG. 1: in step S110, subject data corresponding to real-time video data being played on a target interface is acquired; in step S120, content data corresponding to the subject data is acquired from a content interactive platform according to the subject data; and in step S130, the real-time video data and the content data are displayed on the target interface simultaneously.

The storage unit 520 may include a readable medium in the form of a volatile storage unit, such as a random access storage unit (RAM) 521 and/or a cache storage unit 522, and may further include a read-only storage unit (ROM) 523.

The storage unit 520 may further include a program/utility tool 524 having a set (at least one) of program modules 525. Such program modules 525 include, but are not limited to, an operating system, one or more application programs, other program modules, and program data. Each or some combination of these examples may include an implementation of a network environment.

The bus 530 may be one or more of several types of bus structures, including a memory unit bus or a memory unit controller, a peripheral bus, a graphics acceleration port, a processing unit, or a local area bus using any bus structure in a variety of bus structures.

The electronic device 500 may also communicate with one or more external devices 570 (such as a keyboard, a pointing device, a Bluetooth device, etc.), and may also communicate with one or more devices that enable a user to interact with the electronic device 500, and/or may also communicate with any device (such as a router, a modem) that can enable the electronic device 500 to interact with one or more other computing devices. Such communication may be performed through an input/output (I/O) interface 550. Moreover, the electronic device 500 may also communicate with one or more networks (such as a local area network (LAN), a wide area network (WAN), and/or a public network, such as the Internet) through the network adapter 560. As shown in the figure, the network adapter 560 communicates with other modules of the electronic device 500 through the bus 530. It should be understood that although not shown in the figure, other hardware and/or software modules may be used in conjunction with the electronic device 500, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to exemplary embodiments of the present disclosure.

Embodiments of the present disclosure also provide a computer-readable storage medium having stored thereon a program product capable of implementing the above methods according to embodiments of the present disclosure. In some possible implementations, aspects of the present disclosure may also be implemented in the form of a program product, which includes program codes. When the program product runs on a terminal device, the program codes are used to cause the terminal device to execute the steps according to various exemplary embodiments of the present disclosure described in the "exemplary methods" section of the present specification.

Figure 6:
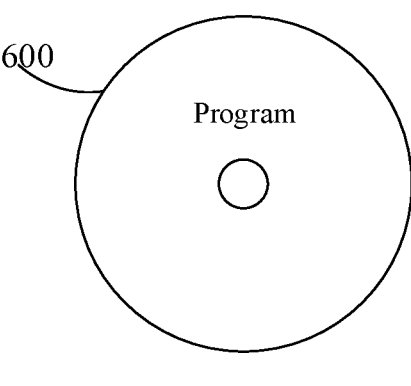
FIG. 6 is a schematic diagram schematically illustrating a computer-readable storage medium according to some embodiments of the present disclosure.

FIG. 6 shows a program product 600 for implementing the above methods according to some embodiments of the present disclosure. The program product 600 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote comput- ing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to exemplary embodiments of the present disclosure.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It should be understood that the present disclosure is not limited to the precise structure that has been described above and shown in the drawings, and various modifications and changes may be made without departing from the scope of the present disclosure. The scope of the disclosure is only defined by the appended claims.

What is claimed is:

1. An information display control method, comprising:
acquiring subject data corresponding to real-time video data being played on a target interface based on processing one or more video frames of the real-time video data using a text recognition machine learning model;
acquiring content data corresponding to the subject data from a content interactive platform according to the subject data;
determining a user-defined time interval for displaying the content data;
displaying the real-time video data and a subset of the content data on the target interface simultaneously for the user-defined time interval, comprising:

processing the real-time video data using an image detection algorithm to determine a non-focus area in the real-time video data based on determining that dynamic imagery is less likely to appear in the non-focus area, as compared to a second area of the real-time video data; and
displaying the subset of the content data in the non-focus area; and
enabling a content interactive platform corresponding to the displayed subset of content data through a jump control in a display area where the subset of content data is displayed, wherein the content interactive platform is a social media platform, and the jump control is a box where the content data is located, and wherein, after enabling the content interactive platform, a position corresponding to the displayed subset of content data is located,
wherein acquiring the content data corresponding to the subject data from the content interactive platform according to the subject data further comprises:
detecting an identification code in the content interactive platform, and extracting the content data corresponding to the identification code;
calculating a similarity between the subject data and the content data; and
acquiring a subset of the content data whose similarity with the subject data is greater than or equal to a similarity threshold, wherein a second subset of the content data having similarity below the similarity threshold is not acquired for display with the real-time video data,
wherein detecting the identification code in the content interactive platform, and extracting the content data corresponding to the identification code further comprises:
acquiring a preset user identification list corresponding to each content interactive platform, wherein the preset user identification list is predefined by users, and the preset user identification list comprises accounts followed by the users corresponding to each content interactive platform; and
detecting the identification code associated with each user identification in the preset user identification list, and extracting content data corresponding to the identification code.

2. The information display control method according to claim 1, wherein the detecting the identification code in the content interactive platform, and extracting the content data corresponding to the identification code, further comprises:
detecting an identification code associated with a target user identification, wherein the target user identification is not in a preset user identification list; and
calculating a popularity value of content data corresponding to the identification code according to a preset popularity algorithm, and extracting content data whose popularity value exceeds a popularity threshold.

3. The information display control method according to claim 1, wherein the displaying the real-time video data and the content data on the target interface simultaneously comprises:
determining core content data corresponding to the content data by performing core extraction on the content data; and
sending the core content data to the target interface so that the real-time video data and the core content data are displayed on the target interface simultaneously.

4. The information display control method according to claim 1, further comprising:

in response to detecting that quantity of the content data is greater than or equal to a quantity threshold, displaying a plurality of the content data on the target interface in a scrolling manner.

5. The information display control method according to claim 1, wherein the acquiring the subject data corresponding to the real-time video data being played on the target interface comprises:

extracting core word data in the real-time video data or introduction data associated with the real-time video data; and determining the subject data corresponding to the real-time video data being played on the target interface according to the core word data.

6. An information display control apparatus, comprising:

a processor; and a memory having computer-readable instruction stored thereon, wherein the computer-readable instruction, when executed by the processor, cause the processor to:

acquire subject data corresponding to real-time video data being played on a target interface based on processing one or more video frames of the real-time video data using a text recognition machine learning model;

acquire content data corresponding to the subject data from a content interactive platform according to the subject data;

determine a user-defined time interval for displaying the content data;

display the real-time video data and a subset of the content data on the target interface simultaneously for the user-defined time interval, comprising:

processing the real-time video data using an image detection algorithm to determine a non-focus area in the real-time video data based on determining that dynamic imagery is less likely to appear in the non-focus area, as compared to a second area of the real-time video data; and displaying the subset of the content data in the non-focus area; and enable a content interactive platform corresponding to the displayed subset of content data through a jump control in a display area where the subset of content data is displayed, wherein the content interactive platform is a social media platform, and the jump control is a box where the content data is located, and wherein, after enabling the content interactive platform, a position corresponding to the displayed subset of content data is located, wherein the processor is further configured to:

detect an identification code in the content interactive platform, and extract the content data corresponding to the identification code;

calculate a similarity between the subject data and the content data; and acquire a subset of the content data whose similarity with the subject data is greater than or equal to a similarity threshold, wherein a second subset of the content data having similarity below the similarity threshold is not acquired for display with the real-time video data, wherein the processor is further configured to:

acquire a preset user identification list corresponding to each content interactive platform, wherein the preset user identification list is predefined by users, and the preset user identification list comprises accounts followed by the users corresponding to each content interactive platform; and detect the identification code associated with each user identification in the preset user identification list, and extract the content data corresponding to the identification code.

7. A non-transitory computer-readable storage medium having a computer program stored thereon, wherein the computer program, when executed by a processor, cause the processor to perform operations of:

acquiring subject data corresponding to real-time video data being played on a target interface based on processing one or more video frames of the real-time video data using a text recognition machine learning model;

acquiring content data corresponding to the subject data from a content interactive platform according to the subject data;

determining a user-defined time interval for displaying the content data;

displaying the real-time video data and a subset of the content data on the target interface simultaneously for the user-defined time interval, comprising:

processing the real-time video data using an image detection algorithm to determine a non-focus area in the real-time video data based on determining that dynamic imagery is less likely to appear in the non-focus area, as compared to a second area of the real-time video data; and displaying the subset of the content data in the non-focus area; and enabling a content interactive platform corresponding to the displayed subset of content data through a jump control in a display area where the subset of content data is displayed, wherein the content interactive platform is a social media platform, and the jump control is a box where the content data is located, and wherein, after enabling the content interactive platform, a position corresponding to the displayed subset of content data is located, wherein the computer program, when executed by a processor, cause the processor to further perform operations of:

detecting an identification code in the content interactive platform, and extracting the content data corresponding to the identification code;

calculating a similarity between the subject data and the content data; and acquiring a subset of the content data whose similarity with the subject data is greater than or equal to a similarity threshold, wherein a second subset of the content data having similarity below the similarity threshold is not acquired for display with the real-time video data, wherein the computer program, when executed by a processor, cause the processor to further perform operations of:

acquiring a preset user identification list corresponding to each content interactive platform, wherein the preset user identification list is predefined by users, and the preset user identification list comprises accounts followed by the users corresponding to each content interactive platform; and detecting the identification code associated with each user identification in the preset user identification list, and extracting the content data corresponding to the identification code.

8. The information display control apparatus according to claim 6, wherein the processor is further configured to:

detect an identification code associated with a target user identification, wherein the target user identification is not in a preset user identification list; and calculate a popularity value of content data corresponding to the identification code according to a preset popularity algorithm, and extract content data whose popularity value exceeds a popularity threshold.

9. The information display control apparatus according to claim 6, wherein the processor is further configured to:

determine core content data corresponding to the content data by performing core extraction on the content data; and send the core content data to the target interface so that the real-time video data and the core content data are displayed on the target interface simultaneously.

10. The information display control apparatus according to claim 6, wherein the processor is further configured to:

in response to detecting that quantity of the content data is greater than or equal to a quantity threshold, display a plurality of the content data on the target interface in a scrolling manner.

11. The information display control apparatus according to claim 6, wherein the processor is further configured to:

extract core word data in the real-time video data or introduction data associated with the real-time video data; and determine the subject data corresponding to the real-time video data being played on the target interface according to the core word data.

\* \* \* \* \*